US007073031B1

(12) United States Patent
MacLellan et al.

(10) Patent No.: US 7,073,031 B1
(45) Date of Patent: Jul. 4, 2006

(54) MULTI-PROCESSOR SYSTEM HAVING DATA COHERENCY

(75) Inventors: Christopher S. MacLellan, Walpole, MA (US); Avinash Kallat, Marlborough, MA (US); Almir Davis, Quincy, MA (US); Stephen L. Scaringella, Holliston, MA (US)

(73) Assignee: EMC Corporation, Hopkinton, MA (US)

( * ) Notice: Subject to any disclaimer, the term of this patent is extended or adjusted under 35 U.S.C. 154(b) by 334 days.

(21) Appl. No.: 10/740,343

(22) Filed: Dec. 18, 2003

(51) Int. Cl.
*G06F 12/00* (2006.01)

(52) U.S. Cl. .................. 711/141; 711/150; 711/163

(58) Field of Classification Search ................ None
See application file for complete search history.

(56) References Cited

U.S. PATENT DOCUMENTS

| | | | | |
|---|---|---|---|---|
| 5,649,102 | A * | 7/1997 | Yamauchi et al. | 709/213 |
| 6,161,168 | A * | 12/2000 | Kametani | 711/147 |
| 6,285,974 | B1 * | 9/2001 | Mandyam et al. | 703/13 |
| 6,466,988 | B1 * | 10/2002 | Sukegawa et al. | 709/248 |

OTHER PUBLICATIONS

Optimizing Parallel Programs with Explicit Synchronization. by Arvind Krishnamurthy et al. 1995 ACM 0-89791-697-2/95/0006.*

* cited by examiner

*Primary Examiner*—Mano Padmanabhan
*Assistant Examiner*—Kaushik Pate

(57) ABSTRACT

A system for maintaining data coherency. The system includes a plurality of processors. A plurality of resources is also included. One portion of the resources is sharable with the plurality of processors and each one of the other ones of the resources being dedicated to a predetermined one of the processors. The system also includes a plurality of buffers. Each one of the buffers is associated with a corresponding one of the plurality of processors. Each one of the buffers is adapted to successively store information presented thereto in successive locations of such one of the buffers. The information includes requests from the corresponding one of the processor. The system includes a logic section responsive to each one of the requests provided by the plurality of processors. The logic section produces indicia indicating whether or not such one of the requests is a request for an operation with one of the sharable resources. The logic section inserts the indicia into a succeeding one of the locations of the buffers associated with such one of the processor providing such one of the requests. The logic section also simultaneously inserts such indicia into a next succeeding available location of the other ones of the plurality of buffers. The logic section inhibits execution of requests in the buffers stored in locations thereof succeeding the location having stored therein any such inserted indicia.

4 Claims, 5 Drawing Sheets

| STEP | FIFO A | FIFO B |
|---|---|---|
| A | RECEIVE REQUEST_1 | |
| B | RECEIVE REQUEST_2 | |
| C | LOGIC RECOGNIZES THAT REQUEST_2 IS TO A SHARED RESOURCE AND INSERTS SYNCH CHARACTER INTO THE A FIFO SLOT BEHIND THE REQUEST_2 AND INTO THE B FIFO | INSERTED SYNCH CHARACTER INTO NEXT AVAILABLE SLOT |
| D | COMPLETE REQUEST_1 | SLOT STILL HAS SYNCH CHARACTER |
| E | | RECEIVE REQUEST_3 INTO NEXT SLOT BUT CANNOT EXECUTE REQUEST_3 BECAUSE THE SLOT BEFORE IT HAS A SYNCH CHARACTER |
| F | COMMENCES EXECUTION OF REQUEST_2 WITH SYNCH CHARACTER STILL IN SLOT AFTER REQUEST_2 | SLOT BEFORE REQUEST_3 STILL HAS SYNCH CHARACTER AND THEREFORE REQUEST_3 CANNOT BE EXECUTED |
| G | COMPLETES REQUEST_2 THEREBY BRINING UP THE SYNCH CHARACTER AND PREVENTING EXECUTION OF ANY OTHER REQUEST THAT MAY HAVE N+BEN RECEIVED AFTER REQUEST_3 | SLOT BEFORE REQUEST_3 STILL HAS SYNCH CHARACTER AND THEREFORE REQUEST_3 CANNOT BE EXECUTED |
| H | REMOVE SYNCH CHARACTER | REMOVE SYNCH CHARACTER |
| I | | COMMENCE EXECUTE REQUEST_3 |

| STEP | FIFO A | FIFO B |
|---|---|---|
| A | RECEIVE REQUEST_1 | |
| B | RECEIVE REQUEST_2 | |
| C | LOGIC RECOGNIZES THAT REQUEST_2 IS TO A SHARED RESOURCE AND INSERTS SYNCH CHARACTER INTO THE A FIFO SLOT BEHIND THE REQUEST_2 AND INTO THE B FIFO | INSERTED SYNCH CHARACTER INTO NEXT AVAILABLE SLOT |
| D | COMPLETE REQUEST_1 | SLOT STILL HAS SYNCH CHARACTER |
| E | | RECEIVE REQUEST_3 INTO NEXT SLOT BUT CANNOT EXECUTE REQUEST_3 BECAUSE THE SLOT BEFORE IT HAS A SYNCH CHARACTER |
| F | COMMENCES EXECUTION OF REQUEST_2 WITH SYNCH CHARACTER STILL IN SLOT AFTER REQUEST_2 | SLOT BEFORE REQUEST_3 STILL HAS SYNCH CHARACTER AND THEREFORE REQUEST_3 CANNOT BE EXECUTED |
| G | COMPLETES REQUEST_2 THEREBY BRINING UP THE SYNCH CHARACTER AND PREVENTING EXECUTION OF ANY OTHER REQUEST THAT MAY HAVE N+BEN RECEIVED AFTER REQUEST_3 | SLOT BEFORE REQUEST_3 STILL HAS SYNCH CHARACTER AND THEREFORE REQUEST_3 CANNOT BE EXECUTED |
| H | REMOVE SYNCH CHARACTER | REMOVE SYNCH CHARACTER |
| I | | COMMENCE EXECUTE REQUEST_3 |

*FIG. 5*

MULTI-PROCESSOR SYSTEM HAVING
DATA COHERENCY

TECHNICAL FIELD

This invention relates to multi-processor systems, and more particularly to multi-processor system having data coherency.

BACKGROUND

As is known in the art, in one type of multi-processor systems, such as shown in FIG. 1, includes a plurality of CPUs, here, a pair of CPUs; e.g., CPU A and CPU B, coupled to a CPU controller, such controller being coupled to a memory. Each one of the CPUs includes a smaller, local cache memory. The local memory cache maintains a copy of data the CPU may have obtained from the memory. Thus, consider, for example, that CPU B obtained data from a particular location in the memory and then performs an operation on such obtained data. Assume now CPU A wants a copy of the latest version of the data at that memory location. In order to prevent CPU A from obtaining the original data from the memory before CPU B returns the modified data (i.e., the latest version of the data) back to memory, the CPU controller prevents CPU B CPU A from obtaining the original data at the particular location from the memory until CPU B returns the modified data to the memory at that particular location. Thus, with such an arrangement, the CPU controller maintains data coherent between the pair of CPUs because, if one of the CPUs, wants to execute a request using data stored in the memory, the CPU controller will prevent the other one of the CPUs from executing such request for the data at the particular location until the modified data is retuned to the memory at the particular location.

In one system, the CPUs communicate with various Input/Output (I/O) devices through a buffer section. Some of the I/O devices are shared by the CPUs (i.e., shared resources) while other I/O devices are specific to one or the other CPU (i.e., non-shared resources). Data processed by CPU A and which is to communicate with resources shared by CPU A is passed through a First-in First-Out (FIFO) memory, FIFO A and data processed by CPU B and which is to communicate with resources shared by CPU B is passed through a FIFO B. The FIFO's can queue requests that can then be executed one after the other in each one of the FIFOs. This provides parallelism between the two CPUs because both CPUs can operate in parallel.

However, as noted above, there may be shared resources. Thus, there may be times when data processed by CPU A is to pass to the shared resources. In such case, the data must be passed through FIFO A and, likewise, data processed by CPU B which is to communicate with shared resources must likewise be passed through FIFO B. With the parallelism described in the system of FIG. 1, however, data coherency is lost.

More particularly, and referring also to FIG. 2, assume, for example, there are three successive requests: REQUEST_1 from CPU A, followed by request REQUEST_2 from CPU A, followed by request REQUEST_3 from CPU B. Assume that REQUEST_2 is a write to a shared resource at a particular location and REQUEST_3 is a read for the data at the same shared resource at the same location. Assume also that the REQUEST_1 requires a relatively long execution time. Thus, REQUEST_3 may be executed before REQUEST_2 has been executed. In such case, the data read from the shared resource is old data, i.e., not the data that was to be written into the shared resources as a result of the execution of REQUEST_2. Thus, data coherency is lost.

SUMMARY

In accordance with the present invention, a system is provided for maintaining data coherency. The system includes a plurality of processors. A plurality of resources is also included. One portion of the resources is sharable with the plurality of processors and each one of the other ones of the resources being dedicated to a predetermined one of the processors. The system also includes a plurality of buffers. Each one of the buffers is associated with a corresponding one of the plurality of processors. Each one of the buffers is adapted to successively store information presented thereto in successive locations of such one of the buffers. The information includes requests from the corresponding one of the processors. The system includes a logic section responsive to each one of the requests provided by the plurality of processors. The logic section produces indicia indicating whether or not such one of the requests is a request for an operation with one of the sharable resources. The logic section inserts the indicia into a succeeding one of the locations of the buffers associated with such one of the processors providing such one of the requests. The logic section also simultaneously inserts such indicia into a next succeeding available location of the other ones of the plurality of buffers. The logic section inhibits execution of requests in the buffers stored in locations thereof succeeding the location having stored therein any such inserted indicia.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 5 is a diagram showing operation of the system of FIG. 2 in executing the requests shown in FIGS. 4A and 4B.

Like reference symbols in the various drawings indicate like elements.

DETAILED DESCRIPTION

Figure 1:
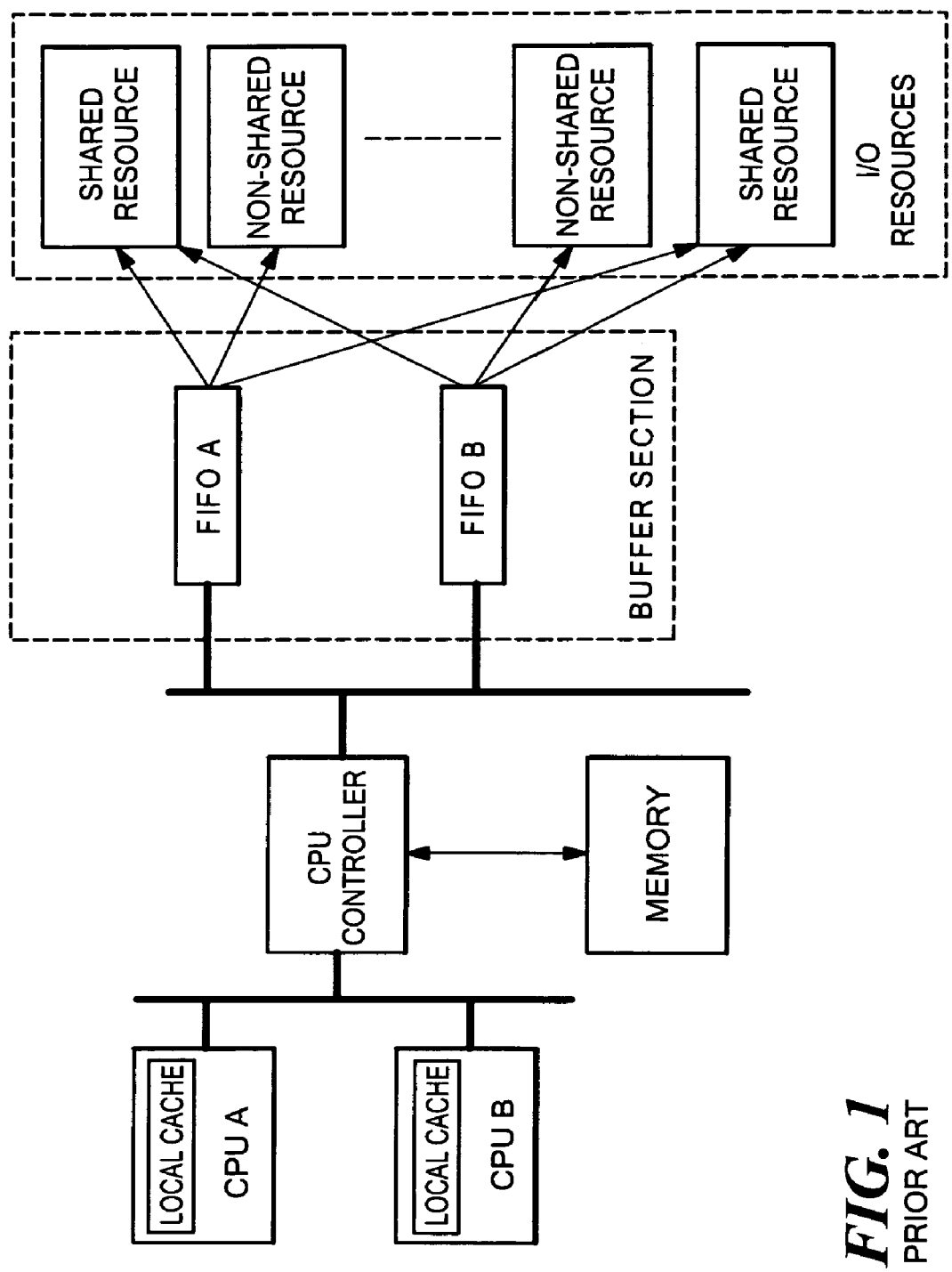
FIG. 1 is a block diagram of a system according to the PRIOR ART.
Figure 2:
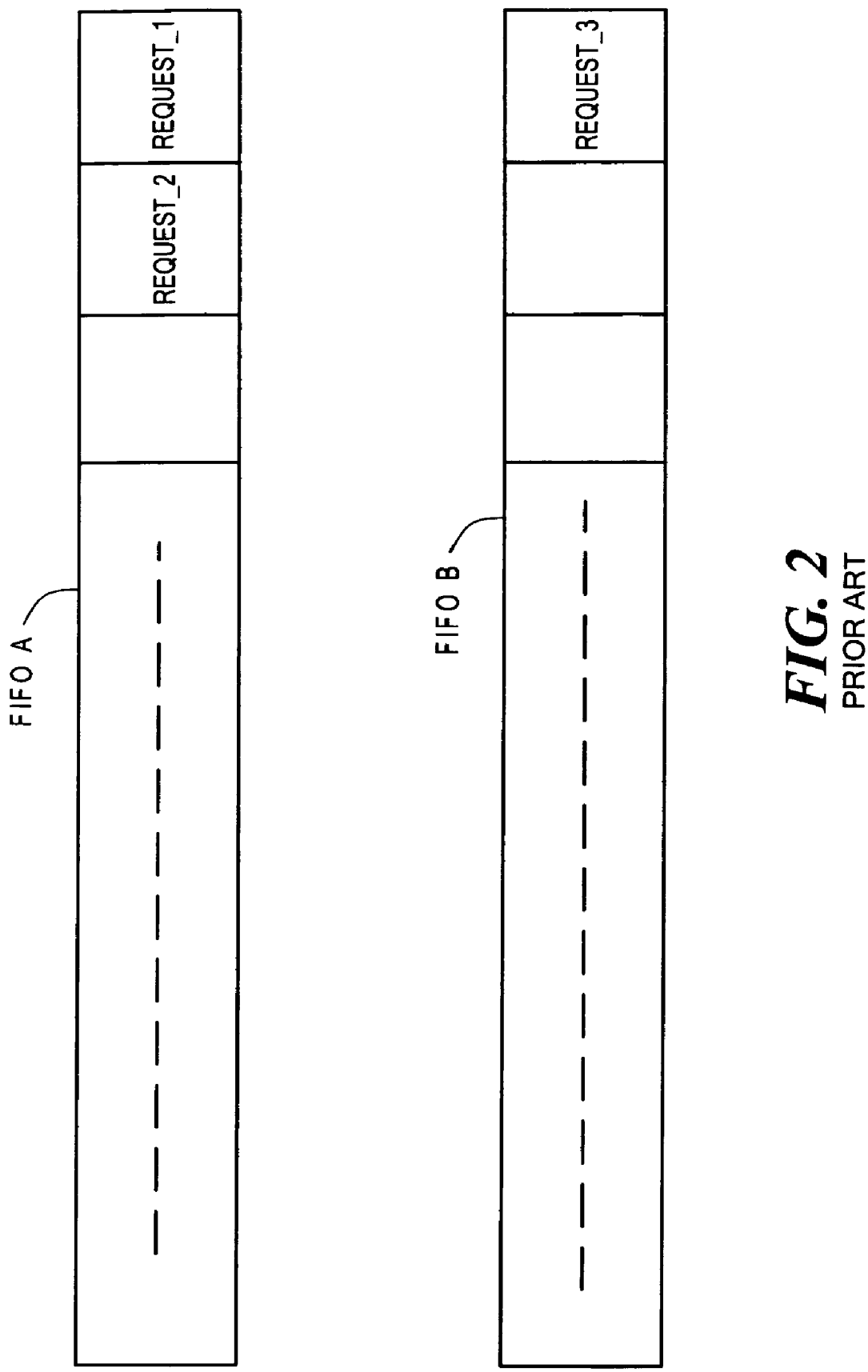
FIG. 2 is a sketch showing requests stored in buffers used in the system of FIG. 1 according to the PRIOR ART.
Figure 3:
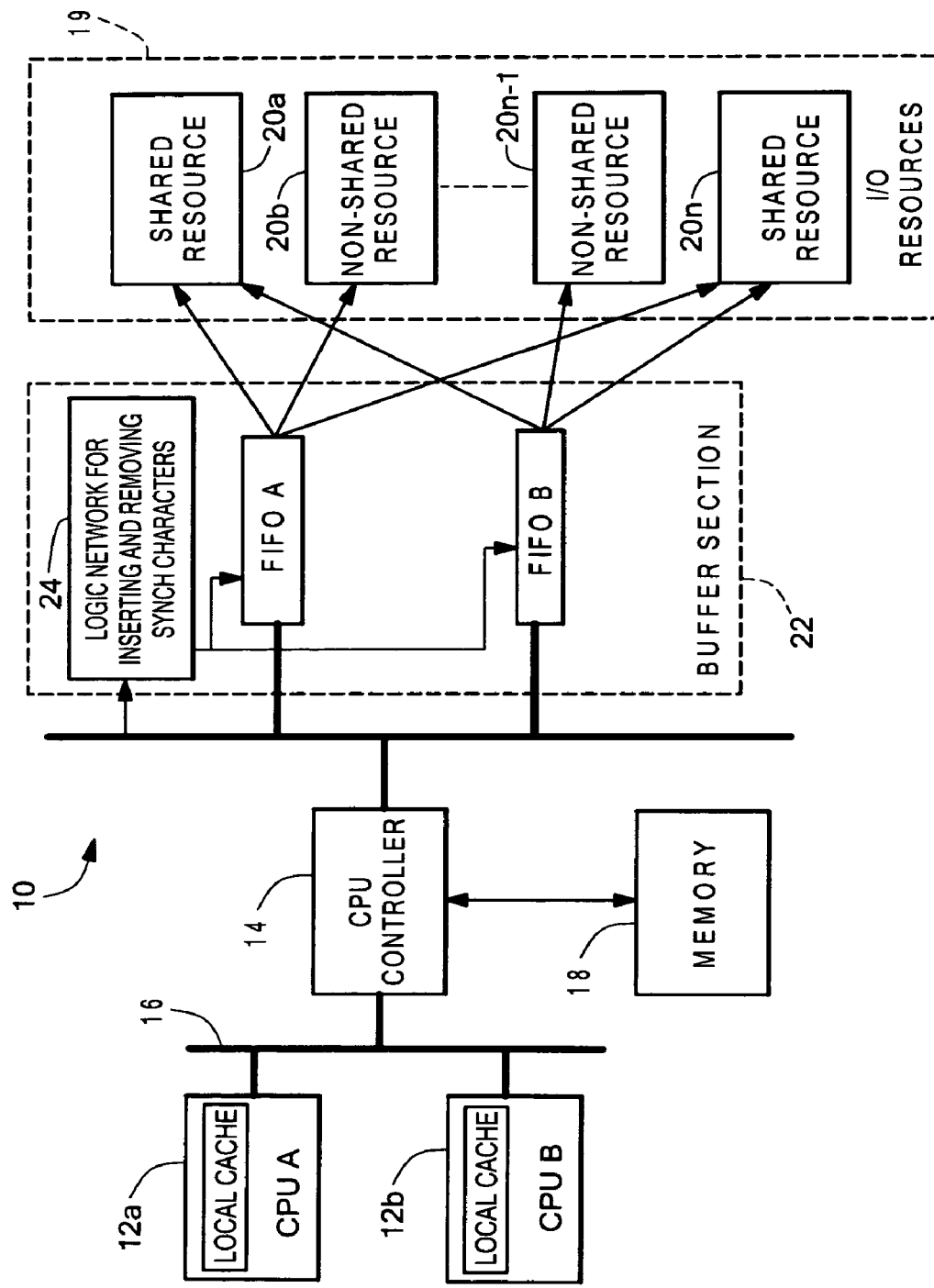
FIG. 3 is a block diagram of a system according to the invention.

Referring now to FIG. 3, a system 10 is shown to include a plurality of processors 12a and 12b, here CPUs having local cache memories, as indicated. A CPU controller 14 is coupled to the processors 12a, 12b (i.e., to CPU A 12a and CPU B 12b) through a bus 16. Also coupled to the CPU controller is a memory 18. The CPU A 12a, CPU B 12b, CPU controller 14 and memory 18 are arranged to provide data coherency. Thus, the local memory cache maintains a copy of data the CPU thereof may have obtained from the memory 18. Thus, consider, for example, that CPU B obtained data from a particular location in the memory 18 and then performs an operation on such obtained data. Assume now CPU A wants a copy of the latest version of the data at that memory location. In order to prevent CPU A from obtaining the original data from the memory before CPU B returns the modified data (i.e., the latest version of the data) back to memory 18, the CPU controller 14 prevents. CPU B CPU A from obtaining the original data at the particular location from the memory 18 until CPU B returns the modified data to the memory 18 at that particular location. Thus, with such an arrangement, the CPU controller 14 maintains data coherent between the pair of CPUs because, if one of the CPUs wants to execute a request using data stored in the memory 18, the CPU controller 18 will prevent the other one of the CPUs from executing such request for the data at the particular location until the modified data is returned to the memory 18 at the particular location.

The system 10 includes an I/O resource section 19 having a plurality of I/O resources 20a–20n. One portion of the resources, here resources 20a and 20n are sharable with the plurality of processors 12a, 12b and each one of the other ones of the resources, here resources 20b–20n–1 are dedicated to a predetermined one of the processors. Thus, here for example, resource 20b is dedicated to CPU A (i.e., processor 12a) and resource 20n–1 is dedicated to CPU B (i.e., processor 12b), as indicated.

Figure 4A:
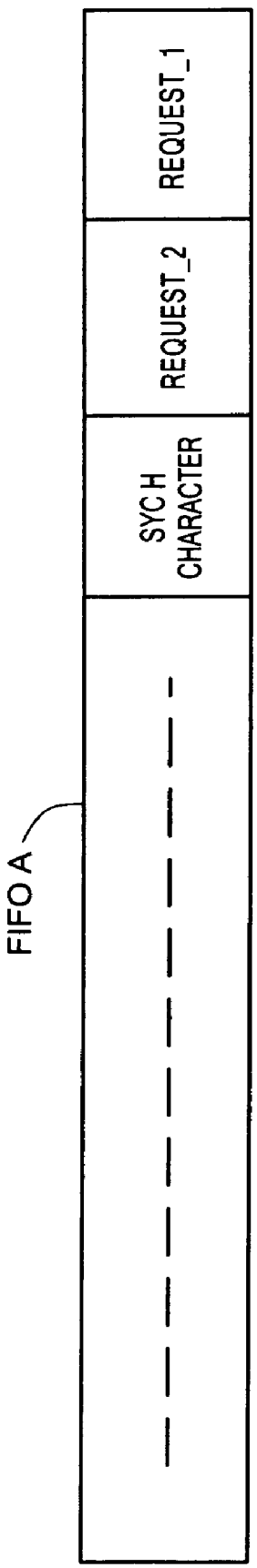
FIGS. 4A and 4B are sketches showing requests stored in a pair of buffers used in the system of FIG. 3 according to the invention.
Figure 4B:
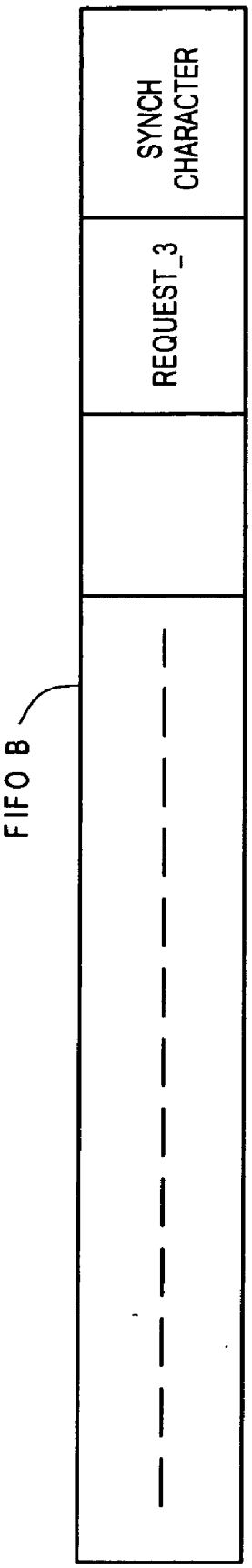

The system 10 also includes a buffer section 22 having a plurality of buffers, here FIFOs each one of the buffers being associated with a corresponding one of the plurality of processors. Thus, in this example, the buffer section 22 includes a FIFO A, corresponding to CPU A, and a FIFO B, corresponding to CPU B. Referring also to FIGS. 4A and 4B, each one of the buffers is adapted to successively store information presented thereto in successive locations of such one of the buffers, such information including requests from the corresponding one of the processor. Thus, referring to FIG. 4A in this example, FIFO A is shown to store two consecutive requests, here a first request REQUEST_1 and a subsequent REQUEST_2. These requests are from the CPU A and thus these requests are stored in FIFO A, i.e., the FIFO associated with, i.e., corresponding to, CPU A. Here, in this example, request REQUEST_1 is to be executed using a non-shared one of the resources, for example, resource 20a. Here, in this example, request REQUEST_2 is to be executed using one of the shared resources, here, for example, resource 20b.

The system 10 includes a logic section 24 responsive to each one of the requests provided by the plurality of processors, (i.e., provided by CPU A and CPU B) for producing an indicia, here a SYNCH_CHARACTER, indicating whether or not such one of the requests is a request for an operation with one of the sharable resources, 20b, 20n. The logic section 24 inserts said indicia SYNCH_CHARACTER into a succeeding one of the locations of the buffers, here FIFOs, associated with such one of the processor providing such one of the requests and simultaneously inserts such indicia into a next succeeding available location of the other ones of the plurality of buffers.

Thus, in this example, the request REQUEST_2 is a request from CPU A requiring execution using a shared resource, here, for example, resource 20b. The logic section 24, in response to such request REQUEST_2, inserts a SYNCH CHARACTER into the location succeeding the location in FIFO A storing request REQUEST_2, as shown in FIG. 4A. At the same time, the logic section 24 inserts a SYNCH CHARACTER into the next available location of FIFO B, as shown in FIG. 4B.

Assume, in this example, that CPU B issues a request REQUEST_3. This third request REQUEST_3 is then stored in the next available location of FIFO B. Thus, the REQUEST_3 is stored the location behind the SYNCH CHARACTER in FIFO B, as shown in FIG. 4B.

The logic section 24 inhibits execution of requests in the buffers stored in locations thereof succeeding the location having stored therein any such inserted indicia. Thus, in this example, REQUEST_3 cannot be executed until the SYNCH CHARACTER before it in FIFO B has been removed. The logic section 24 removes the SYNCH CHARACTER in both FIFO A and FIFO B only when the next location to be executed in both FIFO A and FIFO B are the SYNCH CHARACTERS.

Referring now to FIG. 5, the example above is described in more detail. In the first step, here Step A, CPU A issues a request, i.e., REQUEST_1, requiring execution by one of the non-shared resources. Thus, REQUEST_1 is stored in the next available location of FIFO A, as shown in FIG. 4A.

Next, in Step B, CPU A issues a request, i.e., REQUEST_2, requiring execution by one of the shared resources. Thus, REQUEST_2 is stored in the next available location of FIFO A, as shown in FIG. 4A. Also, because REQUEST_2 requires use of a shared resource, in Step C, the logic section 24 recognizes that REQUEST_2 uses a shared resource and inserts a SYNCH_CHARACTER into the next available location, or slot, of FIFO A, i.e., into the slot of FIFO A behind, or succeeding, the location storing REQUEST_2. Simultaneously, the logic section 24 inserts a SYNCH_CHARACTER into the next available, i.e., succeeding, location of all other FIFOs, here FIFO B, as shown in FIG. 4B.

In Step D, REQUEST_1 is completed.

In Step E, CPU B issues a request, i.e., REQUEST_3, requiring execution by one of the shared resources. Thus, REQUEST_3 is stored in FIFO B in the location after the location storing the SYNCH_CHARACTER in FIFO B. as shown in FIG. 4B. Thus, the logic section 24 will prevent execution of REQUEST_3 until the SYNCH_CHARACTER in the location before, i.e., preceding the location having REQUEST_3 is removed.

In Step F, the REQUEST_2 can be executed and therefore, execution of REQUEST_2 commences. It is noted that the location preceding REQUEST_3 in FIFO B still has a SYNCH_CHARACTER and thus its execution is still inhibited by the logic network 24.

In Step G, execution of REQUEST_2 is completed, bringing up to the next location in FIFO A a SYNCH_CHARACTER. This SYNCH_CHARACTER prevents execution of any other request which may have been subsequently received by FIFO A.

The logic network 24 now sees SYNCH_CHARACTERs in all FIFOs, here in both FIFO A and FIFO B. In response to detection of the SYNCH_CHARACTERs in all FIFOs, the logic network 24 removes all the SYNCH_CHARACTERs in STEP H thereby allowing for execution of the next unexecuted requests in either or both FIFO A and/or FIFO is B. Here, in Step I, REQUEST_3 is executed.

A number of embodiments of the invention have been described. Nevertheless, it will be understood that various modifications may be made without departing from the spirit and scope of the invention. Accordingly, other embodiments are within the scope of the following claims.

What is claimed is:

1. A system, comprising:

a plurality of processors;

a plurality of resources, one portion of the resources being sharable with the plurality of processors and each one of the other ones of the resources being dedicated to a predetermined one of the processors;

a plurality of buffers, each one of the buffers being associated with a corresponding one of the plurality of processors, each one of the buffers being adapted to successively store information presented thereto in successive locations of such one of the buffers, such information including requests from the corresponding one of the processor;

a logic section responsive to each one of the requests provided by the plurality of processors for producing an indicia indicating whether or not such one of the requests is a request for an operation with one of the sharable resources, such logic section inserting said indicia into a succeeding one of the locations of the buffers associated with such one of the processor providing such one of the requests and for simultaneously inserting such indicia into a next succeeding available location of the other ones of the plurality of buffers, such logic section inhibiting execution of requests in the buffers stored in locations thereof succeeding the location having stored therein any such inserted indicia.

2. The system recited in claim 1 wherein the buffers are FIFOs.

3. A method, comprising:

providing a plurality of resources, one portion of the resources being sharable with the plurality of processors and each one of the other ones of the resources being dedicated to a predetermined one of the processors;

providing a plurality of buffers, each one of the buffers being associated with a corresponding one of the plurality of processors, each one of the buffers being adapted to successively store information presented thereto in successive locations of such one of the buffers, such information including requests from the corresponding one of the processor;

producing, in response to each one of the requests provided by the plurality of processors an indicia indicating whether or not such one of the requests is a request for an operation with one of the sharable resources, inserting said indicia into a succeeding one of the locations of the buffers associated with such one of the processor providing such one of the requests and for simultaneously inserting such indicia into a next succeeding available location of the other ones of the plurality of buffers, and inhibiting execution of requests in the buffers stored in locations thereof succeeding the location having stored therein any such inserted indicia.

4. The method recited in claim 3 wherein the method provides FIFOs for the buffers.

* * * * *